United States Patent Office 2,781,473
Patented Feb. 12, 1957

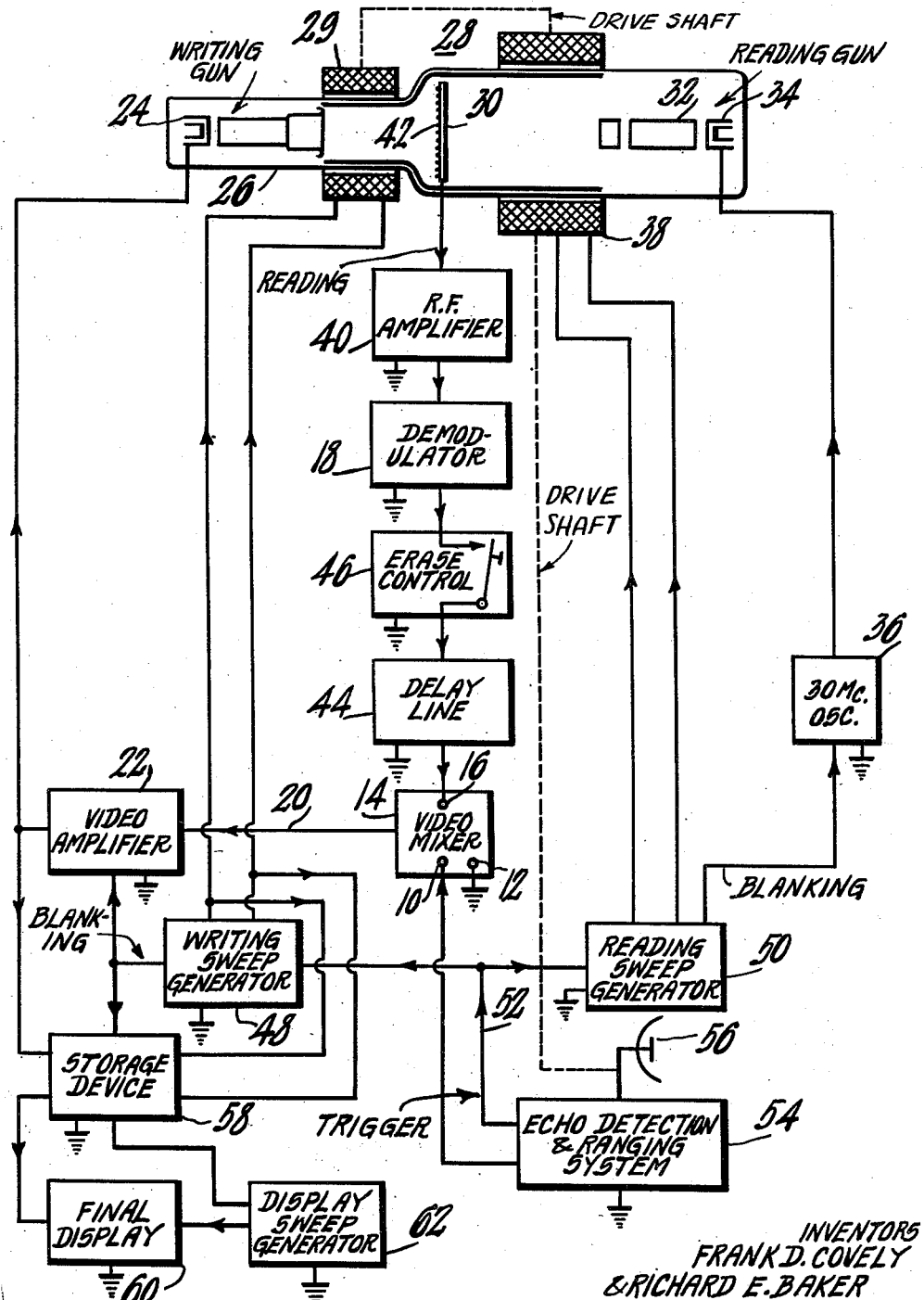

2,781,473

ELECTRICAL SIGNAL STORAGE

Frank D. Covely, Collingswood, N. J., and Richard E. Baker, Indianapolis, Ind., assignors to Radio Corporation of America, a corporation of Delaware Application July 12, 1951, Serial No. 236,442

8 Claims. (Cl. 315—13)

The present invention is related to the storage of electrical signals.

In the copending application of Richard E. Baker and Frank D. Covely, entitled "Signal Display System," Serial No. 225,230, filed May 8, 1951, is described a system and a method for storing electrical signals for an indeterminate time. The copending application of Leslie E. Flory, entitled "Signal Storage System," Serial No. 225,197, filed May 8, 1951, now U. S. Patent No. 2,702,356, discloses an improvement of the said copending Baker application. In the said Flory application a pair of storage tubes are employed, and electrical signals stored on one tube are withdrawn or read and stored on the second tube. New signals may, if desired, be added as the read signals are being stored on the second tube. In similar fashion, the signals are withdrawn and read from the second tube, new signals being added if desired. If the loop gain is approximately unity, it is apparent that the stored signals will be retained with little modification for a long time, yet with the possibility of adding new signals. If the loop gain is greater than unity, the signal amplitude will increase with storage time. If the loop gain is less than unity, the signals will decay at a rate dependent on the gain. These systems are of value in certain radar (radio echo detection and ranging) systems where an effective integration of signals corresponding to the same location may be achieved together with a consequent improvement of signal-to-noise ratio as a result of the integration. As a similar improvement in signal-to-noise ratios is contemplated in the present invention when used with a radar system in a similar manner, the reason for the improvement will become clearer hereinafter. These systems and that of the present application may also find utility in sonar (sound echo detection and ranging) or radar systems where long storage times are required. For example, the highest persistence cathode ray tubes used in a PPI (plan position indication) type of system, may be insufficient to allow display of the entire region being surveyed by the radar or sonar system at the desired rate of scan of the region. Some system of increasing the storage time of the signals, yet permitting new signals to be added and the display of all the stored signals, is desirable.

Accordingly, it is an object of the present invention to improve the storage of electrical signals and particularly as applied to systems in which the stored signals circulate.

Another object of the invention is to simplify circuits and the storage of electrical signals in which the signals are circulated.

A further object of the invention is to provide a system for the storage of electrical signals of the type in which the stored signals are circulated by an arrangement permitting employment of only a single storage tube.

It is a further object of the invention to utilize with improved efficiency the available storage target surface of storage tubes in systems of the general types described.

Another object is to provide novel means for erasure of selected portions of stored electrical information.

In accordance with the invention a storage tube is employed of the type having separate reading and writing guns. The signals are stored as charges on the storage target of the tube by the writing beam. The reading beam is modulated by a signal of a frequency outside the band of the frequency components of the stored signals. This modulation enables frequency separation of the reading signals which are then delayed a certain time and re-applied to the writing beam. The writing beam lags the reading beam in its sweep over the target by a time corresponding to the delay in the circulated signal. All the stored information may be removed or erased from the circulating signal by merely interrupting the flow of the circulating signal for the desired time to accomplish the effective erasure. New signals may readily be added to the storage.

The foregoing objects and other objects, advantages, and novel features of the invention will be more apparent from the following description when taken in connection with the accompanying drawing in which the sole figure is a circuit diagram schematically illustrating a typical embodiment of the invention.

Referring to the drawing, the signals to be stored may be applied between terminals 10 and 12 of a mixing circuit which is to mix incoming signals with those just read. These signals may come, for example, from a radar system and are to be stored on a storage tube, as will appear more fully hereinafter. Since it is contemplated that the signals to be stored are of a type to be displayed on a cathode ray tube or the like, the circuit 14 is termed a video mixer. Preferably, for reasons set out hereinafter, a non-additive mixer is employed for video mixer 14. A discussion of such non-additive circuits and their employment may be found in Vacuum Tube Amplifiers, edited by Valley and Wallman, volume 18 of the Radiation Laboratory Series, starting near the bottom of page 100. An improved form of such a non-additive mixing circuit is disclosed in the copending application of Edwin N. Seabury, Serial No. 209,241, filed February 3, 1951, now U. S. Patent 2,695,953. The terminal 12 is connected to a common ground conductor conventionally indicated.

The circulating signal is also applied to the non-additive video mixer 14 at a terminal 16 from a delay line 44 supplied through an erase control 46 with signals from a demodulator 18. The output of the video mixer 14 is applied by a connection 20 to a video amplifier 22. A control element 24 of a writing electron gun 26 of a storage tube 28 receives the output of the video amplifier 22. Magnetic deflection coils 29, as illustrated (or well-known electrostatic deflection plates) provide deflection means for the electron beam generated in the gun 26. The gun 26 is schematically shown without any power supplies being illustrated, such power supplies being well-known. The storage tube 28 may be of the type disclosed in the RCA Review for March, 1949, volume X, No. 1, starting at page 59, in the article by Louis Pensak entitled "The Graphecon—a picture storage tube." The tube illustrated corresponds to Fig. 3 of the RCA Review article, but the manner of use and connection of the other two electron beam types discussed in the article for purposes of the present invention will be apparent to those skilled in the art from a study of the description of the invention herein disclosed. A target 30 of the storage tube receives the electron beam modulated by the signals from the amplifier 22 and stores an electrical charge corresponding to the signal at each point as the beam is swept across the target 30. A second electron gun 32 supplies a second beam of electrons on the reading side of the target 30. Control element 34 of the gun 22 receives a 30 mc./s. (megacycles per second) sine wave signal from a 30 mc./s. oscillator 36. The reading beam from the reading gun 32 may be deflected by suitable currents in the deflection coils 38. An R. F. (radio frequency) amplifier 40 receives signals from a signal electrode 42 of the target 30 and rejects all signals except a 30 mc./s. signal and its side bands.

By reason of the oscillator, the signals from electrode 42 are 30 mc./s. modulated by the stored charges. The R. F. amplifier serves also as a filter to reject signals being written at the same time the reading is in progress. After amplification, the signals from the R. F. amplifier 40 are demodulated in demodulator 18 and thence passed through an erase control circuit 46 which is here illustrated as a simple switch. From the erase control circuit 46, the signals are applied to a delay line 44, which may be, for example, a lumped constant circuit simulating the lay action of a two wire line, or any other suitable type of delay circuit, many of which are known. From delay line 44 the signals are applied to the terminal 16 of the non-additive video mixer 14. The system employs a pair of sweep generators, a writing sweep generator 48, and a reading sweep generator 50 both of which are synchronized by a suitable trigger signal applied to a connection 52. The circuit illustrated may be utilized in connection with a pulse echo detection and ranging system 54 from which pulses of R. F. energy are emitted from a radiator or receptor 56 and echoes received at radiator or receptor 56 are demodulated and applied as the video signals appearing at the terminal 10 of the video mixer 14. The echo detection and ranging system may be either a radar or sonar set, the radiator or receptor being respectively either an antenna or a sound radiator or receptor, as known. The trigger signal on connection 52 is synchronized with the emission of the pulse of energy. It is contemplated that the returned signals may be stored and ultimately displayed in the form of a plan position indicator display. For this purpose, there is provided a storage device 58 which may be another storage tube and a final display device 60 which may be a simple cathode ray tube having its own sweep generators 62. The interposition of the storage device 58 may be used so that slow sweeps giving a very bright final display may be used in reading signals from the optional storage device 58. The storage device 58 is not necessary, and the voltages from the writing generator 48 may be applied in suitable manner directly to the tube of the final display device 60 as by applying the signal from video amplifier 22 directly to the display device 60, provided the final display tube has a long persistence phosphor.

In operation, the radar system 54 emits a pulse of radio frequency energy at the antenna 56. At the same time, the writing sweep generator 48 receives a trigger signal and applies a sweep voltage to the deflection coils 28 of the writing beam. The writing beam is thereupon deflected, for example, from the center of the target 30 radially outward at a constant rate. Any echoes received in the interval before the next trigger pulse, are detected by the radar system 54 and applied to the terminal 10. If no previous signals have been stored or are circulating, the signal from the terminal 10 is applied to the video amplifier 22 and thence to modulate the writing beam by means of the control element 24. This modulation causes the storage of a charge on the target 30 at a point radially distant from the center at which the sweep is initiated by an amount proportional to the range of the echoing object from the radar system 54. The reading beam and writing beam deflection coils 38, 29 are connected mechanically to each other to rotate together and as by a servo or follow-up system to the antenna 56. The antenna 56 is presumed in this instance to be of the type which is mechanically rotated to different azimuthal angles, whereby the azimuth of the echoing object may be determined upon receipt of any echo. Accordingly, the deflection coils 29 and 38 cause the radial deflection of the writing and reading beams to be at the same angle from some predetermined radial lines on the target 30 as the azimuthal angle of the antenna 56. Other means are known for controlling the sweeps of the two beams coordinated with the angles of the radiated energy from which the echo is received. These means may be different from the simple mechanical arrangement indicated here. Other types of display may also be employed. The reading beam from the reading gun 32 is also deflected in radial manner by the coils 38 energized by the reading sweep generator 50, but travels in advance of the writing beam from the writing gun 26. Preferably, the advance is slight, and the two beams sweep the same strobe (radial line) at the same time, the one in advance of the other. Accordingly, previously stored signals are read or acquired from the target by the amplifier 40, demodulated in the demodulator 18, delayed a certain time by the delay line 44, and then applied to the terminal 16 of the video mixer 14. If no new signals are applied, the signals pass to the video amplifier 22 and thence are rewritten or re-stored. The delay time between the reading of the signal picked up from electrode 42 and its passage around the loop comprising the R. F. amplifier 40, demodulator 18, erase control 46, delay line 44, mixer 14, video amplifier 22, and back to the control element 24 of the storage tube should be equal as nearly as possible to the time required for the writing beam to traverse the distance of separation on the target between the two beams. It is then apparent that the stored signal will be rewritten on the target at the same point from which it was read.

It is important in the system disclosed that the circulating loop time from the reading to the writing of a signal is large enough so that the reading beam travels ahead of the writing beam. If the two beams overlap, the reading signal would supply writing information during the writing of the information at the same points on the target. This would result in causing any target to be stretched to the end of the radial sweep so that it would subsequently appear as a single signal target having a width or a time duration corresponding to the length of the radial sweep from the range of initiation of the echo.

It is highly desirable also that the linearity, the size of beam spot, and the registry of the sweep lines be within accuracies equivalent to the storage element size. If this is not true, there will be a tendency for echoes to creep as they are circulated in the circulating loop to be stored again. That is, there will be a tendency for a signal, after its initial storage and after circulating around the loop a few times, to be displaced from its initial storage position. This is undesirable.

In order to prevent such creeping, an anti-creep wave form may be added to the linear reading sweep wave form in the reading sweep generator 50 in such a way as to produce a modified sweep to cause the reading beam to step from point to point along the target. One ideal of a modified sweep wave form to inhibit creeping of stored signals would be with periods of fixed currents and periods of uniformly increasing currents alternating. Such a sweep tends to cause the creeping to be isolated to the spots where the reading beam is momentarily undeflected. Such a current form applied to the reading deflection coils 38 would cause the reading beam to be displaced in its radial direction and then stop by equal incremental steps preferably each step between stops being sufficient to separate the beam spots at the target. The lagging writing beam would cover the same line at a linear rate. This ideal wave form for the reading beam deflection is readily approximated by the superposition of a high frequency sine wave on a linear deflection wave form. The feature of the anti-creep wave form is the sole invention of applicant Richard E. Baker, on whose behalf a separate application Serial No. 236,016, filed July 10, 1951 has been filed claiming this feature, which application is now U. S. Patent No. 2,717,976. Even with the anti-creep wave form, however, the delay in the loop circuit is substantially equal to the time for the lagging writing beam to cover the distance between beams because the rapid variations in velocity of the reading beam may be considered as averaged out.

There is a blanking signal indicated as applied from the reading sweep 50 to the 30 mc./s. oscillator 36. This blanking signal may be applied either through the oscillator 36 or directly to the control element 34. Its object is to prevent the reading of any signals beyond a certain point near the center of the radial sweep lines. Either the writing or reading of signals within this area may be prevented, since if the signal is not being read or if it is not being written, there will be no reading of signals in this area. This blanking is merely to take care of the flyback time of the writing or reading beams because the writing beam obviously cannot write signals during its flyback time.

The non-additive mixer 14 is preferred because without it, for example, if a linear mixer is employed, new information may be linearly added to the old causing the writing grid signal to be, say, twice the amplitude of the original signal. Similarly for fixed targets. This might cause an effect similar to "blooming" in kinescope cathode ray tubes, with a spread of the electron beam, resulting in "cross-talk" between the beams, if the spread overlaps the reading beam. Or it may cause increase in the apparent area of received signals. The non-additive mixer avoids or at least tends to avoid such effects, by keeping the writing signal below a specified value.

The anticreep wave form takes care of "creep" in the range, or the direction of beam sweep, but not in azimuth (the deflection transverse to the range sweep). To avoid such azimuthal creep, each of the sweep lines may be displaced from an adjacent one a distance to prevent "cross-talk" or "creep" between adjacent sweep lines. This may be done if a central blanking interval of sufficient size is used. Alternatively, azimuthal angular intervals could be "blanked," only the alternate intervals being employed for the writing and reading of signals. The latter method could also be employed to prevent creep in range by blanking alternate small range intervals. However, to do so would involve a loss of signals which are saved by the system and method of the invention, thereby maintaining an improved signal-to-noise ratio by retaining all of the useful signals. The blanking schemes involve some loss of signals.

Several variations of the system are possible. If sufficient delay can be secured in the loop circuit, as may be possible with high velocity sweeps, the delay time may be the time of sweep of one line. The inherent delay of the loop circuit may be sufficient without the delay line 44.

It is particularly pointed out here that the full capabilities of the tube 28 are employed and that the target is not divided in such a manner that the tube is being employed as the equivalent of two tubes, for example, it is not desired to write on half the target while reading on the other half and then use the techniques of the prior copending applications to reverse the writing and reading tubes.

Preferably, the loop gain of the circuit is approximately unity. If the loop gain of the circuit is approximately unity, the signals from a single complete azimuthal scan, for example, could be written upon the tube 28 and due to the loop circuit, these signals would continue to be read and written for a comparatively long length of time. Theoretically there is no limit but in practice noise introduced by the circuits and by the storage tube would limit the length of time over which readable signals could be taken. If the signals are circulated, they may always be observed upon the final display device 60 or may be intermediately stored in the storage device 58 from which they are withdrawn for display in the device 60. The loop gain, however, may be less than unity, or with sufficiently frequent erasures to avoid saturation effects, may be greater than unity.

Erasure of stored signals is readily accomplished by interruption of the circulating signals by the erase control switch 46. If the tube operation is with complete erasure on reading, as preferred, interruption only once of any selected portion of the signals will completely destroy the storage. Otherwise, of course, repeated interruption of the selected signal portions for erasure of a part, or prolonged interruption for erasure of all of the circulating signals is required for complete erasure.

It will be apparent that a novel system for prolonged storage time of electrical signals has been disclosed in which, with only a single storage tube and a suitable loop circuit, it is possible to circulate the stored signals and retain the storage of the signals for a time much enlarged over the capabilities of the storage tube alone.

What is claimed is:

1. An electric signal storage system comprising a storage tube having a storage target, a reading electrode associated therewith, a reading beam electron gun, a writing beam electron gun, and deflection means one respectively for deflecting the electron beam from each gun, said writing gun having a control electrode, a signal circulating loop circuit having an input connected to said reading electrode and an output connected to said writing gun control electrode, means including said deflection means for deflecting said beams across said target on the same paths with the writing beam following the reading beam substantially by the delay time required for signals to traverse said signal circulating loop circuit whereby signals stored on said target are stored again after circulation in said loop circuit at substantially the same place on said target.

2. The system claimed in claim 1, further comprising a means selectively to interrupt the signal in said loop circuit to permit selective erasure of stored signals.

3. The system claimed in claim 1, further comprising an oscillator having an operating frequency outside the frequency band of the stored signals and connected to apply a carrier signal of said operating frequency to said writing gun control electrode, said loop circuit comprising a filter means rejecting signals of said frequency band and accepting signals of said operating frequency, and a demodulator connected to receive the output of said filter, whereby the reading signals are separated from the signals being written at the same time the reading is in progress.

4. An electric signal storage system comprising, a storage tube having a storage target, means for producing a writing beam of electrons for writing signals on said storage target, means for producing a reading beam of electrons for reading signals off said target, means for deriving output signals in response to said reading, a signal circulating loop connected between said output signal deriving means and said writing beam producing means, and means including deflection means for deflecting said beams across said target on the same paths with the writing beam following the reading beam substantially by the delay time required for signals to traverse said signal circulating loop whereby signals stored on said target are stored again after circulation in said loop at substantially the same places on said target.

5. A system as claimed in claim 4, said writing and reading beams producing means being located on opposite sides of said storage tube target, an oscillator having an operating frequency outside the frequency band of the stored signals connected to apply a carrier signal to said reading beam producing means, and said loop circuit comprising a filter for accepting signals at said operating frequency and a demodulator connected to receive the output of said filter.

6. The system claimed in claim 4, said loop circuit comprising a signal mixing circuit having a pair of input connections and an output connection, one input connection being connected to receive signals from said output signal deriving means and the other input connection being available to receive signals from an external signal source, said output connection being connected to apply signals to said writing means, and a means selectively to interrupt the signal between said output signal deriving means and said signal mixing circuit.

7. An electric signal storage system comprising a storage tube having a storage target to store electrical signals, means to write signals on said storage target, means to read the signals written on said storage target, a signal circulating loop circuit having an input connected to receive signals from said signal reading means and having an output connected to said signal writing means, and means including deflection means for deflecting said writing and reading beams across said target with said writing beam following said reading beam by an amount substantially equal to the delay time required for signals to traverse said loop circuit, whereby signals withdrawn are re-written on said target on substantially the same points from which they are read, said loop circuit comprising a signal mixing circuit having a pair of input connections and an output connection, one input connection being connected to receive signals from said reading means and the other input connection being available to receive signals from an external signal source, said output connection being connected to apply signals to said writing means, said mixing circuit being a non-additive mixing circuit.

8. An electrical signal storage system comprising a storage tube having a storage target to store electrical signals, means to write signals on said storage target, means to read the signals written on said storage target, a signal circulating loop circuit having an input connected to receive signals from said signal reading means and having an output connected to said signal writing means, and means including deflection means for deflecting said writing and reading beams across said target with said writing beam following said reading beam by an amount substantially equal to the delay time required for signals to traverse said loop circuit, whereby signals withdrawn are re-written on said target on substantially the same points from which they are read, further comprising an oscillator having an operating frequency outside the frequency band of the stored signals and connected to apply a carrier signal of said operating frequency to said reading means, said loop circuit comprising a filter means rejecting signals of frequency outside of said frequency band and accepting signals of said operating frequencies, and a demodulator connected to receive the output of said filter, whereby the reading signals are separated from the signals being written at the same time the reading is in progress.

References Cited in the file of this patent

UNITED STATES PATENTS

| | | |
|---|---|---|
| 2,547,638 | Gardner | Apr. 3, 1951 |
| 2,548,789 | Hergenrother | Apr. 10, 1951 |
| 2,549,072 | Epstein | Apr. 17, 1951 |

OTHER REFERENCES

Williams et al.: "A Storage System for Use With Binary Digital Computing Machines"; Proceedings of the Institute of Electrical Engineers, vol. 86, #40, part III, March 1949, pages 81–100.